United States Patent Office.

LUDWIG BRUMLEU AND ERNEST BRUMLEU, OF CUERO, TEXAS.

INSECTICIDE.

SPECIFICATION forming part of Letters Patent No. 530,010, dated November 27, 1894.

Application filed October 14, 1893. Serial No. 488,197. (No specimens.)

*To all whom it may concern:*

Be it known that we, LUDWIG BRUMLEU and ERNEST BRUMLEU, of Cuero, in the county of De Witt and State of Texas, have invented a new and useful Improvement in Insect-Poisons, of which the following is a specification.

Our invention relates to a new compound of arsenic to be used as an insect poison in the place of Paris green or London purple, and which may also be easily and cheaply converted into a beautiful green powder which may be advantageously used as a pigment.

Our compound is made in the following way: We take one hundred pounds of copperas (sulfate of iron) and fifty pounds of the arsenic of commerce (arsenious acid) and bring them together in a tank, box, or other suitable vessel where they can be easily mixed or stirred, and then over this is poured boiling water sufficient to dissolve the copperas, say from twenty to twenty-five gallons. The mass is then thoroughly stirred until the copperas is dissolved. We then take about fifty pounds of dry lime, slaked, and after mixing it with water to the consistence of milk, it is added to the copperas and arsenic and is thoroughly stirred until all the copperas is decomposed. The chemical action which takes place is the decomposition of the sulfate of iron (copperas) into ferrous oxid and sulfate of lime. In the substance so obtained is contained, ferrous oxid, and ferric oxid, arsenious oxid, and sulfate of lime (gypsum). The sulfuric acid combines with the lime to form sulfate of lime, while the ferrous oxid has to be converted into ferric oxid by exposure to the air which will provide the necessary oxygen to turn the ferrous oxid into ferric oxid. The mixture of ferrous oxid and ferric oxid, arsenious oxid, and sulfate of lime is therefore exposed to the air for several days and dried, and in this step it absorbs the needed oxygen, and the hitherto gray pulp turns to a yellow powder, which forms a valuable insect powder, and one having peculiar distinctive properties on account of the lime which it contains which causes it to remain soft and adhere to the leaves of the plants to which it may be applied. In this particular it is superior to Paris green or London purple which in order to make it stick is usually placed on the leaves of the plants in the morning or late in the evening when the dew is on the leaves. To convert this yellow powder into a useful green pigment it is only necessary to add one or two pounds of prussiate of potash which with the iron makes prussian blue and this mixing with the yellow powder gives green as the resultant color of yellow and blue. The prussiate of potash should be dissolved in water and added to the copperas and arsenic before decomposition. This green compound is equally effective as an insect poison and may be so used.

These compounds whether used for insect poisons or pigments are very much cheaper than those of a similar quality ordinarily employed and are equally effective.

Having thus described our invention, what we claim as new, and desire to secure by Letters Patent, is—

The compound herein described consisting of ferric oxid, arsenious acid, and sulfate of lime combined in about the proportions described.

LUDWIG BRUMLEU.
ERNEST BRUMLEU.

Witnesses:
A. H. WEISENBURG,
J. W. GRAVES.